United States Patent [19]

Tabor et al.

[11] Patent Number: 5,372,885
[45] Date of Patent: Dec. 13, 1994

[54] METHOD FOR MAKING BICOMPONENT FIBERS

[75] Inventors: Ricky L. Tabor; Zdravko Jezic, both of Lake Jackson; Gerald M. Lancaster, Freeport; Gene P. Young; John O. Bieser, both of Lake Jackson; Malcolm F. Finlayson, Houston, all of Tex.

[73] Assignee: The Dow Chemical Company, Midland, Mich.

[21] Appl. No.: 8,043

[22] Filed: Jan. 22, 1993

Related U.S. Application Data

[63] Continuation of Ser. No. 563,458, Aug. 7, 1990, abandoned, which is a continuation-in-part of Ser. No. 289,084, Dec. 22, 1988, Pat. No. 4,950,541, which is a continuation-in-part of Ser. No. 836,665, Mar. 5, 1986, abandoned, which is a continuation-in-part of Ser. No. 641,087, Aug. 15, 1984, abandoned.

[51] Int. Cl.$^5$ .............. D01F 8/06; D01F 8/12; D01F 8/14
[52] U.S. Cl. .............. 428/373; 428/374; 428/375; 428/395; 264/DIG. 26; 264/171; 264/174
[58] Field of Search .............. 428/373, 375, 374; 264/DIG. 26, 171, 174

[56] References Cited

U.S. PATENT DOCUMENTS

| | | | |
|---|---|---|---|
| 3,509,013 | 4/1970 | Oppenlander | 428/373 |
| 4,563,392 | 1/1986 | Harpell et al. | 428/373 |
| 4,789,592 | 12/1988 | Taniguchi et al. | 428/373 |
| 5,018,828 | 5/1991 | Ohdaira et al. | 428/373 |
| 5,045,401 | 9/1991 | Tabor et al. | 525/74 |
| 5,082,899 | 1/1992 | Sawyer et al. | 525/74 |

FOREIGN PATENT DOCUMENTS

| | | | |
|---|---|---|---|
| 0366379 | 5/1990 | European Pat. Off. | |
| 1040618 | 2/1989 | Japan | 428/373 |
| 1118620 | 5/1989 | Japan | 428/373 |
| 1266217 | 10/1989 | Japan | 428/373 |
| 1290415 | 11/1989 | Japan | 428/373 |
| 2112415 | 4/1990 | Japan | 428/373 |
| 3059113 | 3/1991 | Japan | 428/373 |
| 2180543A | 4/1987 | United Kingdom | |

OTHER PUBLICATIONS

Chisso Corp., Derwent Abstract, AN-85-212633/35.

*Primary Examiner*—Carman J. Seccuro, Jr.

[57] ABSTRACT

A method is disclosed for making thermoplastic bicomponent fibers by contacting under thermally bonding conditions (a) a first component being at least one high performance thermoplastic polymer, such as PET, PBT, nylon or the like, and (b) a second component which is olefinic and which forms at least a portion of the fiber's surface characterized by (b) including at least one grafted olefinic polymer, preferably at least one grafted linear ethylene polymer, having pendant succinic acid or succinic anhydride groups; whereby the fiber is dyeable. The bicomponent fibers made by this process can be in a variety of shapes (e.g., round, oval, trilobal, flat, or hollow) and configurations (e.g., symmetrical sheath/core or side-by-side or asymmetrical crescent/moon). The succinic acid or succinic anhydride groups are provided by grafting, respectively, maleic acid or maleic anhydride onto the linear ethylene polymers especially by a process wherein the grafting is done in a twin-screw, co-rotating extruder with the maleic acid or maleic anhydride being injected into a pressured zone of the extruder. The acid containing grafted linear ethylene polymer or polymer blends are dyeable in contradistinction to ungrafted linear ethylene polymers.

6 Claims, No Drawings

METHOD FOR MAKING BICOMPONENT FIBERS

CROSS-REFERENCE TO RELATED APPLICATIONS

This is a continuation of application Ser. No. 07/563,458, filed Aug. 7, 1990, now abandoned, all which is a continuation-in-part application of pending Ser. No. 289,084, filed Dec. 22, 1988 now U.S. Pat. No. 4,950,541, which is a continuation-in-part of Ser. No. 836,665, filed Mar. 5, 1986, now abandoned, which is a continuation-in-part of Ser. No. 641,087, filed Aug. 15, 1984, now abandoned, and is related to application Ser. No. 825,161, filed Feb. 3, 1986, now U.S. Pat. No. 4,684,576 and to application Ser. No. 318,049 filed Mar. 2, 1989 now abandoned.

It is related to Ser. No. 489,390, filed Mar. 6, 1990 now U.S. Pat. No. 4,966,870 which is a division of Ser. No. 229,078, filed Aug. 5, 1988, now U.S. Pat. No. 4,927,888 which was filed as a continuation-in-part of Ser. No. 905,099, filed Sep. 5, 1986, now U.S. Pat. No. 4,762,890.

It is also related to Ser. No. 266,455, filed Nov. 2, 1988 now U.S. Pat. No. 5,082,899.

The above applications are incorporated herein by reference.

FIELD OF THE INVENTION

The present invention pertains to dyeable thermoplastic bicomponent fibers and a method of preparation. These bicomponent fibers are characterized by contacting under thermally bonding conditions (a) a first component comprising at least one high performance thermoplastic polymer, and (b) a second component comprising at least one grafted linear ethylene polymer having pendant succinic acid or succinic anhydride groups. The bicomponent fibers can be prepared by coextruding (a) and (b) into fiber having a round, oval, trilobal, triangular, dog-boned, flat or hollow shape and a sheath/core or side-by-side configuration. The bicomponent fiber can be coextruded using melt blown, spunbond or staple fiber manufacturing process conditions. The present invention also pertains to a method of bonding high performance fibers using the dyeable thermoplastic bicomponent fibers of the present invention as binder fibers.

BACKGROUND OF THE INVENTION

Various olefin fibers, i.e., fibers in which the fiber-forming substance is any long chain, synthetic polymer of at least 85 weight percent ethylene, propylene, or other olefin units, are known from the prior art. The mechanical properties of such fibers are generally related in large part to the morphology of the polymer, especially molecular orientation and crystallinity. Thus, crystalline polypropylene fibers and filaments are items of commerce and have been used in making products such as ropes, non-woven fabrics, and woven fabrics. Polypropylene is known to exist as atactic (largely amorphous), syndiotactic (largely crystalline), and isotactic (also largely crystalline). The largely crystalline types of polypropylene (PP), including both isotactic and syndiotactic, have found wide acceptance in certain applications in the form of fibers.

Other types of olefins which can be suitably formed into fibers include linear ethylene polymers, such as linear high density polyethylene (HDPE) having a density in the range of 0.941–0.965 grams/cubic centimeter (g/cc) and linear low density polyethylene (LLDPE) having a density typically in the range of low density polyethylene (LDPE) and linear medium density polyethylene (LMDPE), or from 0.91 g/cc to 0.94 g/cc and ultra linear low density polyethylene (ULDPE) having a density between about 0.88 g/cc and about 0.915 g/cc. The densities of the linear ethylene polymers are measured in accordance with ASTM D-792 and defined as in ASTM D-1248-84. These polymers are prepared using coordination catalysts and are generally known as linear polymers because of the substantial absence of branched chains of polymerized monomer pendant from the main polymer backbone. LLDPE is a linear low density ethylene polymer wherein ethylene has been polymerized along with minor amounts of $\alpha,\beta$-ethylenically unsaturated alkenes having from three to twelve carbon ($C_3$–$C_{12}$) atoms per alkene molecule, and more typically four to eight ($C_4$–$C_8$). Although LLDPE contains short chain branching due to the pendant side groups introduced by the alkene comonomer and exhibits characteristics of low density polyethylene such as toughness and low modulus, it generally retains much of the strength, crystallinity, and extensibility normally found in HDPE homopolymers. In contrast, polyethylene prepared with the use of a free radical initiator, such as peroxide, gives rise to highly branched polyethylenes known as low density polyethylene (LDPE) and sometimes as high pressure polyethylene (HPPE) and ICI-type polyethylenes. Because of unsuitable morphology, notably long chain branching and concomitant high melt elasticity, LDPE is difficult to form into a fiber and has inferior properties as compared to LLDPE, HDPE and PP fibers.

One application of certain fibers such as, for example, polyvinyl chloride, low melting polyester and polyvinylacetate, has been the use of such fibers as binder fibers by blending the binder fiber with high performance natural and/or synthetic fibers such as polyesters (e.g., polyethylene terephthalate (PET) or polybutylene terephthalate (PBT)), polyamides, cellulosics (e.g., cotton), modified cellulosics (e.g., rayon), wool or the like, and heating the fibrous mixture to near the melting point of the binder fiber to thermally weld the binder fiber to the high performance fiber. This procedure has found particular application in non-woven fabrics prepared from performance fibers which would otherwise tend to separate easily in the fabric. However, because of the availability of reactive sites in the olefin fibers, the bonding of olefin fibers to the performance fibers is characterized by encapsulation of the performance fiber by the melted olefin fiber at the thermal bonding site by the formation of microglobules or beads of the olefin fiber. Moreover, it is difficult to achieve suitable thermal bonding in this fashion because of the poor wettability of a polar performance fiber by a nonpolar olefin fiber.

Another problem which has hampered the acceptance of olefin fibers is a lack of dyeability. Olefin fibers are inherently difficult to dye, because there are no sites for the specific attraction of dye molecules, i.e., there are no hydrogen bonding or ionic groups, and dyeing can only take place virtue of weak van der Walls forces. Usually, such fibers are colored by adding pigments to the polyolefin melt before extrusion, and much effort has gone into pigmentation technology for dispersing a dye into the polyolefin fiber. This has largely been unsuccessful because of the poor lightfastness, poor fastness to dry cleaning, generally low color build-up, stiffness, a necessity for continuous production changes, poor color uniformity, possible loss of fiber strength and the involvement of large inventories.

Bicomponent fibers are typically fabricated commercially by melt spinning. In this procedure, each molten polymer is extruded through a die, e.g., a spinnerette, with subsequent drawing of the molten extrudate, solidification of the extrudate by heat transfer to a surrounding fluid medium, and taking up of the solid extrudate. Melt spinning may also include cold drawing, heat treating, texturizing and/or cutting. An important aspect of melt spinning is the orientation of the polymer molecules by drawing the polymer in the molten state as it leaves the spinnerette. In accordance with standard terminology of the fiber and filament industry, the following definitions apply to the terms used herein:

A "monofilament" (also known as "monofil") refers to an individual strand of denier greater than 15, usually greater than 30;

A "fine denier fiber or "filament" refers to a strand of denier less than 15;

A "multi-filament" (or "multifil") refers to simultaneously formed fine denier filaments spun in a bundle of fibers, generally containing at least 3, preferably at least 15–100 fibers and can be several hundred or several thousand;

An "extruded strand" refers to an extrudate formed by passing polymer through a forming-orifice, such as a die;

A "bicomponent fiber" refers to a fiber comprising two polymer components, each in a continuous phase, e.g. side-by-side or sheath/core;

A "bicomponent staple fiber" refers to a fine denier strand which have been formed at, or cut to, staple lengths of generally one to eight inches (2.5 to 20 cm).

The shapes of these bicomponent fibers, extruded strands and bicomponent staple fibers can be any which is convenient to the producer for the intended end use, e.g., round, trilobal, triangular, dog-boned, flat or hollow. The configuration of these bicomponent fibers or bicomponent staple fibers can be symmetric (e.g., sheath/core or side-by-side) or they can be asymmetric (e.g., a crescent/moon configuration within a fiber having an overall round shape).

Convenient references relating to fibers and filaments, including those of man made thermoplastics, and incorporated herein by reference, are, for example:

(a) *Encyclopedia of Polymer Science and Technology*, Interscience, New York, vol. 6 (1967), pp. 505–555 and vol. 9 (1968), pp. 403–440;

(b) *Kirk-Othmer Encyclopedia of Chemical Technology*, vol. 16 for "Olefin Fibers", John Wiley and Sons, New York, 1981, 3rd edition;

(c) *Man Made and Fiber and Textile Dictionary*, Celanese Corporation;

(d) Fundamentals of Fibre Formation—The Science of Fibre Spinning and Drawing, Adrezij Ziabicki, John Wiley and Sons, London/New York, 1976;

(e) Man Made Fibres, by R. W. Moncrieff, John Wiley and Sons, London/New York, 1975.

Other references relevant to this disclosure include U.S. Pat.No. 4,644,045, incorporated herein by reference, which describes spun bonded non-woven webs of LLDPE having a critical combination of percent crystallinity, cone die melt flow, die swell, relation of die swell to melt-index, and polymer uniformity; European Patent Application No. 87304728.6 which describes a non-woven fabric formed of heat bonded bicomponent filaments having a sheath of LLDPE and a core of polyethylene terephthalate.

In CA 91:22388p (1979) there is described a fiber comprising polypropylene and ethylene-maleic anhydride graft copolymer spun at a 50:50 ratio and drawn 300 percent at 100° C., and a blend of the drawn fibers and rayon at a 40:60 weight ratio carded and heated at 145° C. to give a bulky non-woven fabric. However, polypropylene is disadvantages in some applications because of its relatively high melting point (145° C.), and because of the relatively poor hand or feel imparted to fabrics made thereof. Poor hand is manifested in a relatively round and inflexible fabric, as opposed to a smooth and flexible fabric.

U.S. Pat. No. 4,684,576, incorporated herein by reference, describes the use of blends of HDPE grafted with maleic acid or maleic anhydride to give rise to succinic acid or succinic anhydride groups along the polymer chain with other olefin polymers as an adhesive, for example, in extrusion coating of articles, as adhesive layers in films and packing, as hot melt coatings, as wire and cable interlayers, and in other similar applications. Similar references describing adhesive blends containing HDPE grafted with unsaturated carboxylic acids, primarily for laminate structures, include U.S. Pat. Nos. 4,460,632; 4,394,485; and 4,230,830 (now re-examined U.S. Pat. No. B1 4,230,830) and U.K. Patent Application Nos. 2,081,723 and 2,113,696. All of the afore-mentioned U.S. patents are herein incorporated by reference.

SUMMARY OF THE INVENTION

An improved method has now been discovered for making thermoplastic bicomponent fibers by contacting under thermally bonding conditions (a) a first component which is at least one high performance thermoplastic polymer, and (b) a second component which is olefinic and which forms at least a portion of the fiber's surface, the improvement comprising (b) including at least one grafted olefinic polymer having pendant succinic acid or succinic anhydride groups, whereby the resulting bicomponent fiber is dyeable. These novel dyeable thermoplastic bicomponent fibers have superior hand, a relatively low melting or bonding temperature, superior adhesive properties, superior dyeability and superior adhesion of the components within the bicomponent fiber. The bicomponent fiber can be prepared by coextruding (a) and (b) into a fiber having a round, oval, trilobal, triangular, dog-boned, flat or hollow shape and a symmetrical or asymmetrical sheath-/core or side-by-side configuration. The bicomponent fiber can be formed under melt blown, spunbond or staple fiber manufacturing conditions. Component (a) can be a polyester (such as polyethylene terephthalate or polybutylene terephthalate) or a polyamide (such as nylon). The grafted olefinic polymer in component (b) comprises at least one grafted olefinic polymer, preferably at least one grafted linear ethylene polymer. The grafted olefinic polymer can be a polymer blend of olefinic polymers and is most preferably a polymer blend of a grafted linear ethylene polymer having pendant succinic acid or succinic anhydride groups and at least one ungrafted linear ethylene polymer. The most preferred polymer blend of a grafted linear ethylene polymer having pendant succinic acid or succinic anhydride groups and at least one ungrafted linear ethylene polymer used as component (b) of the bicomponent fiber of the present invention preferably consists essentially of a blend of grafted HDPE and ungrafted LLDPE, but comprises at least one of ULDPE, LLDPE, LMDPE, or HDPE.

In a further aspect of the invention, there is provided an improved method of bonding high performance natural and/or synthetic fibers such as polyether (e.g., PET or PBT), polyamides (e.g., nylon), cellulosics (e.g., cotton), modified cellulosics (e.g., rayon), wool or the like, with binder fibers and heating the fibrous mixture to thermally bond the binder fiber to the high performance fiber, the improvement comprising providing the dyeable thermoplastic bicomponent fibers of the present invention used as binder fibers. The bicomponent fiber of the present invention used as a binder fiber can be used for dyeing by contacting said bicomponent fiber with a water soluble cationic dye.

In still another aspect, the invention provides a fabric comprising dyeable thermoplastic bicomponent fibers.

It still another aspect, the invention provides a fabric comprising dyeable thermoplastic bicomponent fibers as binder fiber blended with performance fibers, wherein the bicomponent binder fibers are bonded to the performance fibers.

In a still further aspect of the invention, there is provided an adhesive polymer blend for fiber forming use as a component in making dyeable thermoplastic bicomponent fibers. The polymer blend comprises at least one grafted linear ethylene polymer having pendant succinic acid or succinic anhydride groups and at least one ungrafted linear ethylene polymer. The adhesive polymer blend can be used to prepare dyeable bicomponent fibers in accordance with the present invention by contacting the fiber with a water soluble ionic dye, preferably a water soluble cationic dye, in a suitable aqueous medium. The aqueous medium can contain surfactants, if desired, to promote contact.

In yet another aspect, there is provided a dyeable thermoplastic bicomponent fiber characterized by (a) a first component comprising at least one high performance thermoplastic polymer, and (b) a second component comprising at least one grafted linear ethylene polymer having pendant succinic acid or succinic anhydride groups which have been contacted under thermally bonding conditions.

DETAILED DESCRIPTIONS

The olefinic polymer used for grafting can be polypropylene (PP), linear HDPE and/or LLDPE. The density of linear HDPE before grafting can be about 0.94 to 0.97 g/cc, but is typically between about 0.945 and 0.965 g/cc, while that of LLDPE before grafting can be about 0.88 to 0.94 g/cc, but is typically between about 0.91 and 0.94 g/cc. Typically, linear HDPE and LLDPE will have about the same density before and after grafting, but this can vary depending on the particular linear ethylene polymer properties, graft level, grafting conditions and the like. Melt flow rate (MFR) measured at 230° C./2.16 kg of PP suitable for use in this invention is from about 0.1 to about 400 grams/10 minutes and typically increases during grafting. The linear ethylene polymer before grafting has a melt index (MI) measured at 190° C./2.16 kg from about 0.1 to about 1000 grams/10 minutes, but typically less after grafting. For example, linear HDPE with a 25 MI and a 0.955 g/cc density grafted to a level of about 1 weight percent maleic anhydride (MAH) has a MI after grafting of about 16–18 grams/10 minutes. Melt index herein is measured in accordance with ASTM D1238 condition 190° C./2.16 kg (also known as condition "E"). The MI of the ungrafted linear ethylene polymer used for grafting is selected depending on the specific melt spinning procedure employed and whether or not the grafted linear ethylene polymer is employed alone or in a blend with another linear ethylene polymer.

The grafting of succinic acid or succinic anhydride groups may be done by methods described in the art which generally involve reacting maleic acid or maleic anhydride is admixture with heated polymer, generally using a peroxide or free radical initiator to accelerate the grafting. The maleic acid and maleic anhydride compounds are known in these relevant arts as having their olefin unsaturation sites conjugated to the acid groups. Fumaric acid, an isomer of maleic acid which is also conjugated, gives off water and rearranges to form maleic anhydride when heated, and thus is operable in the present invention. Grafting may be effected in the presence of oxygen, air hydroperoxides, or other free radical initiators, or in the essential absence of these materials when the mixture of monomer and polymer is maintained under high shear and heat conditions. A convenient method for producing the graft polymer is extrusion machinery, although Brabender mixers or Banbury mixers, roll mills and the like may also be used for forming the graft polymer. It is preferred to employ a twin-screw devolatilizing extruder (such as a Werner-Pfleiderer twin-screw extruder) wherein maleic acid or maleic anhydride is mixed and reacted with the linear ethylene polymer(s) at molten temperatures to produce and extrude the grafted polymer.

The anhydride or acid groups of the grafted polymer generally comprise from about 0.001 to about 10 weight percent, preferably from about 0.01 to about 5 weight percent, and especially from 0.1 to about 1 weight percent of the grafted polymer. The grafted polymer is characterized by the presence of pendant succinic acid or anhydride groups along the polymer chain, as opposed to the carboxylic acid groups obtained by the bulk copolymerization of ethylene with an $\alpha,\beta$-ethylenically unsaturated carboxylic acid such as acrylic acid as disclosed in European Patent Application number 88116222.6 (EP Publication number 0 311 860 A2). Grafted linear HDPE is the preferred grafted linear ethylene polymer.

The grafted linear ethylene polymer(s) can be employed singly or as a component in a polymer blend with other ungrafted olefinic polymers. Other ungrafted olefinic polymers useful in a polymer blend in the present invention include but are not limited to PP, LDPE, ULDPE, LMDPE, HDPE, and various terpolymers and interpolymers known to those skilled in the art. Grafted linear ethylene polymers are especially preferred as the ungrafted olefinic polymer used in the polymer blends.

The polymer blend preferably contains from about 0.5 to about 99.5 weight percent of grafted linear ethylene polymer, more preferably from about 1 to 50 weight percent grafted linear ethylene polymer, and especially from about 2 to 15 weight percent grafted linear ethylene polymer. The polymer blend can also include conventional additives, such as dyes, pigments, antioxidants, UV stabilizers, spin finishes, and the like and/or relatively minor proportions of other fiber forming polymers which do not significantly alter the melting properties of the blend or the improved hand obtained in fabrics containing fibers employing LLDPE as a polymer blend component.

The LLDPE employed either as the grafted linear ethylene polymer component or as the ungrafted component in the dyeable thermoplastic bicomponent fiber, comprises at least a minor amount of a $C_3$-$C_{12}$ olefinically unsaturated alkene, preferably a $C_4$-$C_8$ olefinically unsaturated alkene, and 1-octane is especially preferred. The alkene may constitute from about 0.5 to about 35 percent by weight of the LLDPE, preferably from about 1 to about 20 weight percent, and most preferably from about 2 to about 15 weight percent.

The grafted linear ethylene polymer (e.g., grafted linear HDPE) and the ungrafted linear ethylene polymer (such as ungrafted LLDPE) may be blended together prior to extrusion, either by melt blending or dry bleeding. Dry blending of pellets of the grafted linear ethylene polymer and the ungrafted linear ethylene polymer prior to extrusion is generally adequate where the melt indices of the blend components are similar, and there will generally be no advantage in melt blending such blend constituents prior to extrusion. However, where melt blending may be desired, as in the case of grafted linear HDPE and LLDPE or dissimilar melt indices, melt blending may be accomplished with conventional blending equipment, such as, for example, mixing extruders, Brabender mixers, Banbury mixers, roll mills and the like.

The high performance thermoplastic polymer useful as such as the second component of the dyeable thermoplastic bicomponent fiber of the present invention can be a polyester (e.g., PET or PBT) or a polyamide (e.g., nylon). The high performance thermoplastic polymer can be used as one component of the bicomponent fiber by contacting it with the grafted linear ethylene polymer(s) under thermally bonding conditions, such as that encountered when coextruding bicomponent fiber using a bicomponent staple fiber die. The high performance polymer can either component of a sheath/core configuration or it can be either component of a side-by-side configuration. The high performance thermoplastic polymer can be chosen to provide stiffness in the bicomponent fiber, especially when the grafted linear ethylene polymer is a polymer blend of grafted linear HDPE blended with ungrafted LLDPE. Additionally, the high performance thermoplastic polymer used in making the bicomponent fiber of the present invention can be the same polymer as that used for making high performance fiber which is blended with the bicomponent fiber.

Extrusion of the polymer through a die to form a fiber is effected using convention equipment such as, for example, extruders, gear pumps and the like. It is preferred to employ separate extruders, which feed gear pumps to supply the separate molten polymer streams to the die. The grafted linear ethylene polymer or polymer blend is preferably mixed in a mixing zone of the extruder and/or in a static mixer, for example, upstream of the gear pump in order to obtain a more uniform dispersion of the polymer components.

Following extrusion through the die, the fiber is taken up in solid form on a godet or another take-up surface. In a bicomponent staple fiber forming process, the fibers are taken up on a godet which draws down the fibers in proportion to the speed of the take-up godet. In the spunbond process, the fibers are collected in a jet, such as, for example, an air gun, and blown onto a take-up surface such as a roller or moving belt. In the melt blown process, air is ejected at the surface of the spinnerette which serves to simultaneously draw down and cool the fibers as they are deposited on a take-up surface in the path of the cooling air. Regardless of the type of melt spinning procedure which is used, it is important that the fibers be partially melt drawn in a molten state, i.e. before solidification occurs. At least some drawdown is necessary in order to orient the polymer molecules for good tenacity. It is not generally sufficient to solidify the fibers without significant extension before take-up, as the fine strands which are formed thereby can hardly be cold drawn, i.e. in a solid state below the melting temperature of the polymer, because of their low tenacity. On the other hand, when the fibers are drawn down in the molten state, the resulting strands can more readily be cold drawn because of the improved tenacity imparted by the melt drawing.

Melt drawdowns of up to about 1:1000 may be employed depending upon spinnerette die diameter and spinning velocity, preferably from about 1:10 to about 1:200, and especially 1:20 to 1:100.

Where the bicomponent staple-forming process is employed, it may be desirable to cold draw the strands with conventional drawing equipment, such as, for example, sequential godets operating at differential speeds. The strands may also be heat treated or annealed by employing a heated godet. The strands may further be texturized, such as, for example, by crimping and cutting the strand or strands to form staple. In the spun bonded or air jet processes, cold drawing of the solidified strands and texturizing is effected in the air jet and by impact on the take-up surface, respectively. Similar texturizing is effected in the melt blown process by the cooling fluid which is in shear with the molten polymer strands, and which may also randomly delinearize the fibers prior to their solidification.

The bicomponent fibers so formed by the above-described process also constitute a part of the present invention. The bicomponent fibers are generally fine denier filaments of 15 denier or less down to fractional deniers, preferably in the range of from 1 to 10 denier, although this will depend on the desired properties of the fibers and the specific application in which they are to be used.

The bicomponent fibers of the present invention have a wide variety of potential applications. For example, the bicomponent fibers may be formed into a batt and heat treated by calendaring on a heated, embossed roller to form a fabric. The batts may also be heat bonded, for example, by infrared light, ultrasound or the like, to obtain a high loft fabric. The fibers may also be employed in conventional textile processing such as carding, sizing, weaving and the like. Woven fabrics made from the bicomponent fibers of the present invention may also be heat treated to alter the properties of the resulting fabric.

A preferred embodiment of the invention resides in the employment of the bicomponent fibers formed according to the process of the invention in binder fiber applications with high performance natural and/or synthetic fibers such as, for example, polyamides, polyesters, silk, cellulosics (e.g. cotton), wool, modified cellulosics such as rayon and rayon acetate, and the like. The bicomponent fibers of the present invention find particular advantage as binder fibers owing to their adhesion to performance fibers and dyeability thereof which is enhanced by the presence of the acid groups in the grafted linear ethylene polymer component and the relatively lower melting temperature or range of the grafted linear ethylene polymer component relative to the performance fiber. The relative proportions of the binder fiber of the present invention employed in admixture with performance fibers in a fiber blend will depend on the desired application and capabilities of the resulting fiber mixture and/or fabric obtained thereby. It is preferred to employ from about 5 to about 95 parts by weight of the binder fiber per 100 parts by weight of the binder fiber/performance fiber mixture, more preferably from about 5 to about 50 parts by weight binder fiber, and especially 5 to 15 parts by weight binder fiber.

In preparing non-woven fabrics from the bicomponent binder fiber/performance fiber blend of the invention, there are several important considerations. Where the binder fibers are in staple form, there should be no fusing of the fibers when they are cut into staple, and the crimp imparted to the binder fibers should be sufficient for blending with the performance fibers to obtain good distribution of the fibers.

The ability of the component comprising at least one grafted linear ethylene polymer having pendant succinic acid or anhydride groups to adhere to the other component of at least one high performance thermoplastic polymer is an important consideration in cutting of bicomponent staple fiber. When bicomponent staple fiber is cut and one of the components (e.g., the core of a bicomponent fiber) protrudes from the cut edge, the fiber will create an irritation when worn next to the skin. The irritation is especially pronounced when the core component is a high performance thermoplastic such as PET. When ungrafted linear ethylene polymer and PET are made, respectively, into a sheath/core bicomponent fiber and cut into short staple fiber, the core of PET protrudes beyond the cut edge. The enhanced adhesion of the grafted linear ethylene polymer component to the PET component used in making the dyeable thermoplastic bicomponent fiber of the present invention reduces PET protrusion beyond the fiber after cutting and thus enables fabrics and fiber blends to be made which can be more comfortably worn next to the skin.

The ability of the bicomponent binder fibers to adhere to the performance fibers is another important consideration. Adhesion and dyeability can generally be controlled by varying the acid content of the binder fiber, either by the level of graft of maleic acid or anhydride in the grafted linear ethylene polymer, or by the proportion of the grafted linear ethylene polymer blended with the ungrafted linear ethylene polymer in the bicomponent binder fibers. In typical non-woven fabrics obtained by thermally bonding the performance fibers with a bicomponent binder fiber, the ability of the binder fibers to bond together the performance fibers depends largely on the thermal bonding of the performance fibers together by the binder fibers. In typical prior art non-woven fabrics employing binder fibers, the binder fiber thermally bonds performance fibers together by at least partially melting to form globules or beads which encapsulate the performance fibers. The binder fibers of the present invention enhance the non-woven fabric by providing great adhesion of the binder fiber to the performance fiber. Employing the binder fibers of the present invention, it is also possible to obtain thermal bonding of the binder fiber to a performance fiber by partial melting and contact adhesion in which the bicomponent binder fibers largely retain their fibrous form, and the resulting non-woven fabric is characterized by a reduced number of globules or beads formed by the melting of the lower melting component of the bicomponent binder fibers.

It is also important for one component of the bicomponent binder fiber to have a relatively broad melting point range or thermal bonding window, particular where hot calendaring is employed to obtain a thermal bonding of a non-woven or woven fabric. A good indication of melting point range or thermal bonding window is the difference between the Vicat softening point and the peak melting point determined by differential scanning calorimetry (DSC). Narrow melting point ranges present a difficult target for process bonding equipment such as a calendar roll, and even slight variations in the temperature of bonding equipment can result in an insufficient bond to be formed between the bicomponent binder fibers and the performance fibers. If too low a temperature is employed, the bicomponent binder fibers will not sufficiently fuse, whereas when too high a temperature is employed, one component of the bicomponent binder fiber may completely melt and run right out of the performance fiber batt. Thus, a broad melting point range is desired in order that partial fusion of one component of the bicomponent binder fiber material can be achieved without a complete melting. A melting point range of at least 7.5° C. is desired for proper thermal bonding, and preferably a sufficiently broad melting point range that a minimum 10° C. bonding window is obtained.

Another important characteristic of bicomponent binder fibers is that when they are melted in equipment such as a calendar roll, one of the components will have a sufficient melt viscosity to be retained in the fiber matrix and not readily flow therefrom. An important advantage of the bicomponent binder fibers of the present invention is that one component has generally higher melt viscosity than fibers consisting of ungrafted LLDPE and/or ungrafted linear HDPE. In addition to using a calendar roll, bonding of the present binder fibers can also be obtained using other bonding techniques, e.g. with hot air, infrared heaters, and the like.

The thermoplastic bicomponent fibers of the invention can be dyed by contacting them with a water soluble ionic dye, preferably a water soluble cationic dye, in a suitable aqueous medium. The aqueous medium can contain surfactants, if desired, to promote contact.

The invention is illustrated by way of, but not limited to, the examples which follow.

EXAMPLE 1

A linear HDPE ethylene/propylene copolymer (the "base" polymer), having a MI of about 25 grams/10 minutes and density of 0.955 g/cc, is extruded with maleic anhydride (3.0 pounds per hour) and dicumyl peroxide (0.3 pounds per hour) at an average melt temperature of 225° C. (the temperature ranged from about 180° to about 250° C.) using a Werner-Pfleiderer twin-screw devolatization extruder. The final incorporated concentration of maleic anhydride is about 1% by weight (as determined by titration) and has a MI of about 16–18 grams/10 minutes; this is called the MAH-grafted linear HDPE concentrate.

Using a 6-inch Farrell two-roll mill, 250 gram samples are blended having compositions ranging from 5% MAH-grafted linear HDPE concentrate to 50% MAH-grafted linear HDPE concentrate is various LLDPE resins at a melt temperature of 170° C. The blends are useful as at least one component in a bicomponent fiber, wherein at least one other component is a performance polymer component, such as PBT or PET.

EXAMPLE 2

Ten percent of a grafted linear HDPE (ethylene/propylene copolymer, MI of 25 grams/10 minutes before grafting, density of 0.955 g/cc before grafting) having about 1% by weight succinic acid groups is blended with about 90% by weight of an ungrafted LLDPE (ethylene/octene copolymer, MI of 18 grams/10 minutes, 0.930 g/cc density) to form a polymer blend having about 0.1% by weight succinic acid groups. The polymer blend is then used as a sheath component in a bicomponent staple fiber spinning operation, with the core component being PET. The sheath/core bicomponent fibers are blended with other performance fibers such as PET or cellulosics, formed into batts and oven bonded. The batts are found to be well-bonded and have good physical integrity.

EXAMPLE 3

Linear HDPE (ethylene-propylene copolymer, MI of 25 grams/10 minutes, 0.955 g/cc density) is grafted with maleic acid to provide succinic acid groups along the polymer chain. Portions of the grafted linear HDPE are then blended with amounts of ungrafted LLDPE (ethylene-octene copolymer, MI of 18 grams/10 minutes, 0.930 g/cc density) to produce polymer blends containing 0.05%, 0.1%, 0.15%, 0.2%, and 0.4% by weight of the succinic acid. The grafted linear HDPE/LLDPE polymer blend samples are coextruded with PET to produce side-by-side bicomponent fibrous material. The adhesion between fibers in a heat-bonded bat of the fibrous material is appreciably better than that obtained in comparison by using the same linear HDPE and LLDPE without any grafted acid groups. The maximum heat-bonded bat strength occurs when using bicomponent fiber having a succinic acid level of about 0.1% by weight.

EXAMPLE 4

Linear HDPE (ethylene-propylene copolymer, MI of 25 grams/10 minutes, 0.955 g/cc density) is grafted with maleic anhydride to provide about 1% by weight succinic anhydride groups along the polymer chain. Portions of the grafted linear HDPE are blended with amounts of ungrafted LLDPE (ethylene-octene copolymer, MI of 18 grams/10 minutes, 0.930 g/cc density) to produce polymer blends containing 0.05%, 0.1%, 0.15%, 0.2%, and 0.5% by weight of the succinic acid groups. Polymer blends of the grafted linear HDPE with the ungrafted LLDPE can be coextruded as the sheath layer in a bicomponent spunbond system using a PET as the core layer. The resultant thermally bonded fabric has a bonded fabric strength higher than that obtained using ungrafted linear ethylene polymer alone as the sheath resin.

EXAMPLE 5

LLDPE (ethylene-octene copolymer, MI of 18 grams/10 minutes, 0.930 g/cc density) does not accept dye when treated with Basic Violet III (a basic dye also known as Crystal Violet) at 80° C. for 15 minutes in the presence of a drop of didecyl dimethyl ammonium chloride used as a wetting agent. When blended with enough LLDPE grafted with maleic anhydride to provide a polymer blend having about 0.15% by weight succinic acid groups, the resulting polymer blend, when treated in the same manner as immediately above, became dyed to a blue/purple color. The dye does not readily leach out, even when placed in boiling water for 10–15 minutes. Other water soluble cationic dyes (i.e., dyes which are typically referred to as "basic dyes" in the industry) can be similarly used to dye the novel bicomponent fibers.

What is claimed is:

1. In a method for making a thermoplastic bicomponent fiber by contacting under thermally bonding conditions (a) a first component which consists of polyethylene terephthalate, polybutylene terephthalate, or nylon, and (b) a second component which is olefinic and which forms at least a portion of the fiber's surface, the improvement comprising (b) including at least one grafted linear high density polyethylene/or linear low density polyethylene having pendant succinic acid or anhydride groups, whereby the resulting bicomponent fiber is dyeable.

2. The method defined by claim 1 wherein said bicomponent fiber is prepared by coextruding (a) and (b) into a fiber having a round, oval, trilobal, triangular, dog-boned, flat or hollow shape and a symmetrical or asymmetrical sheath/core or side-by-side configuration.

3. The method defined by claim 2 wherein said bicomponent fiber has a round shaped and a sheath/core configuration.

4. The method defined by claim 1 wherein said bicomponent fiber is prepared by coextruding (a) and (b) into a fiber having a sheath/core configuration, and wherein (a) is a polyester, and wherein (b) includes a polymer blend of a grafted linear HDPE or LLDPE having pendant succinic acid or succinic anhydride groups and at least one ungrafted linear HDPE or LLDPE.

5. The method defined by claim 6 wherein (a) is polyethylene terephthalate or polybutylene terephthalate and wherein (b) is a polymer blend of a grafted linear high density ethylene polymer and an ungrafted linear low density ethylene polymer.

6. The method defined by claim 1 wherein said fiber is formed under melt blown, spunbond or staple fiber manufacturing process conditions.

* * * * *